UNITED STATES PATENT OFFICE.

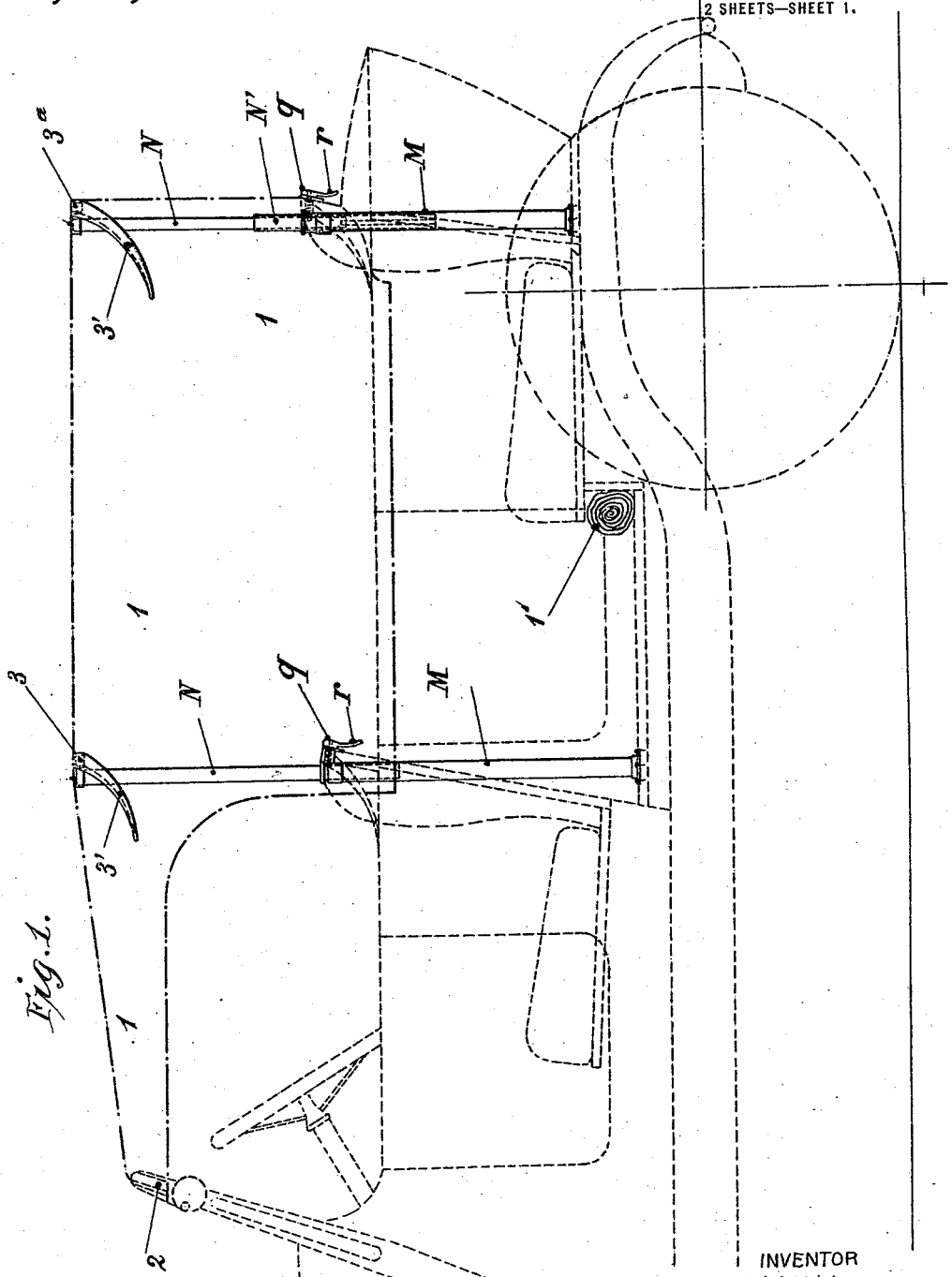

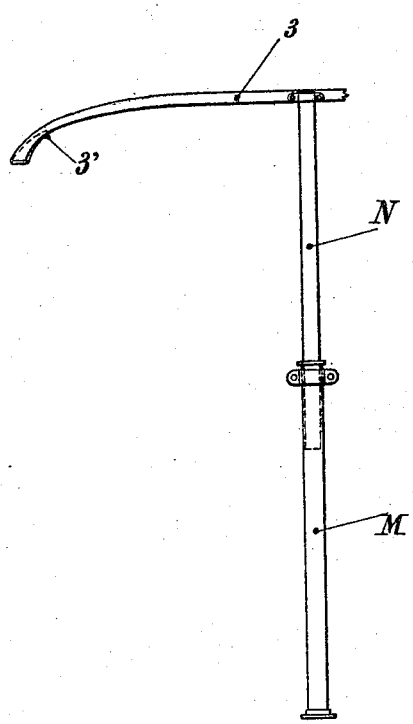

GABRIEL VOISIN, OF PARIS, FRANCE, ASSIGNOR TO SOCIETE ANONYME DES AEROPLANES G. VOISIN, OF PARIS, FRANCE.

HOOD FOR VEHICLES.

1,419,704.          Specification of Letters Patent.    Patented June 13, 1922.

Application filed September 21, 1920. Serial No. 411,819.

*To all whom it may concern:*

Be it known that I, GABRIEL VOISIN, citizen of the Republic of France, residing at Paris, in the Republic of France, have invented new and useful Improvements in Hoods for Vehicles, of which the following is a specification.

This invention relates to a hood for vehicles in which all the elements thereof can be concealed from view when the said hood is not mounted in place. In the known devices, the hood when out of use is folded back to the rear, thus requiring the use of a considerable number of articulations and stay rods which rapidly become loose and whose combination with the canvas gives rise to an unsightly and cumbersome device at the rear of the vehicle. The present device is intended to obviate these various inconveniences.

According to this invention, the supporting members for the hood comprise vertical telescoping uprights disposed on the longitudinal axis of the vehicle and having mounted thereon a cross arm carrying a removable canvas member, the front part of the latter being secured to the frame of the wind shield, while the other parts are secured to the carriage body. On the other hand, the said uprights are adapted to entirely disappear within suitable sockets concealed in the lining of the carriage body, and the cross arms disposed upon the upper ends of the uprights are given a suitable shape whereby they are made to cooperate exactly with the upper edge of the carriage body and will thus coincide with the latter when the hood is not used.

In the accompanying drawing which shows by way of example an embodiment of this invention:

Fig. 1 is an elevation of a portion of a vehicle showing a removable hood for vehicles constructed according to the invention.

Fig. 2 is a detail view of the supporting member for the hood.

As shown in the drawings, the removable hood comprises a canvas member 1 having the form indicated in the broken lines and appropriate to the vehicle. The said canvas member is secured at the front part to the frame 2 of the wind shield, being supported at the middle part by the cross member 3, and at the rear end by the cross member $3^a$. It is also secured to various suitable points of the carriage body. Upon removing the hood, the said canvas member is folded or rolled up and is stowed in a place set apart for the same under the cushions of the rear seat at 1', for instance, or at any other suitable place.

The cross supporting members 3, $3^a$ are shown in Fig. 1, as mounted in position. Each of them is secured upon a tube N slidable within a second tube M which is concealed in the interior lining of the carriage body and is contained therein when the hood is out of use. The said tube N may be locked at its lower position (hood folded) or at its upper position (hood extended) by a device comprising a spring bolt $q$ actuated by a small lever $r$.

Each horizontal cross member 3, $3^a$ is constituted by a sheet iron member of curved shape and possesses the particular feature in that it is adapted to cooperate exactly with the profile of the carriage body in such manner that when the hood is out of use it coincides with the handrail or border. This shape is especially to be observed at the ends as shown at 3' (Figs. 1 and 2).

The rear support of the canvas is constructed upon exactly the same principle, but inasmuch as the carriage body has not the same height in this portion, in order to maintain the hood in a horizontal position, the tube N of the rear upright is itself provided with a telescoping extension member N'.

Having now described my invention, what I claim as new and desire to secure by Letters Patent is:

A removable hood for vehicles provided with a wind shield, comprising telescoping uprights in the middle longitudinal plane of the vehicle body, said uprights embodying lower members secured to said vehicle body and concealed within the lining of the carriage body, and upper members, horizontal cross members made in one piece and rigidly secured respectively to said upper members, said cross members having such a shape that they will fit exactly the upper edge of the carriage body and a canvas member removably secured to the wind shield, the horizontal cross members and the carriage body.

In testimony whereof I have signed my name to this specification.

GABRIEL VOISIN.